June 12, 1962 J. K. GOULD 3,038,664
TEMPERATURE LIMITING DEVICE
Filed June 19, 1958
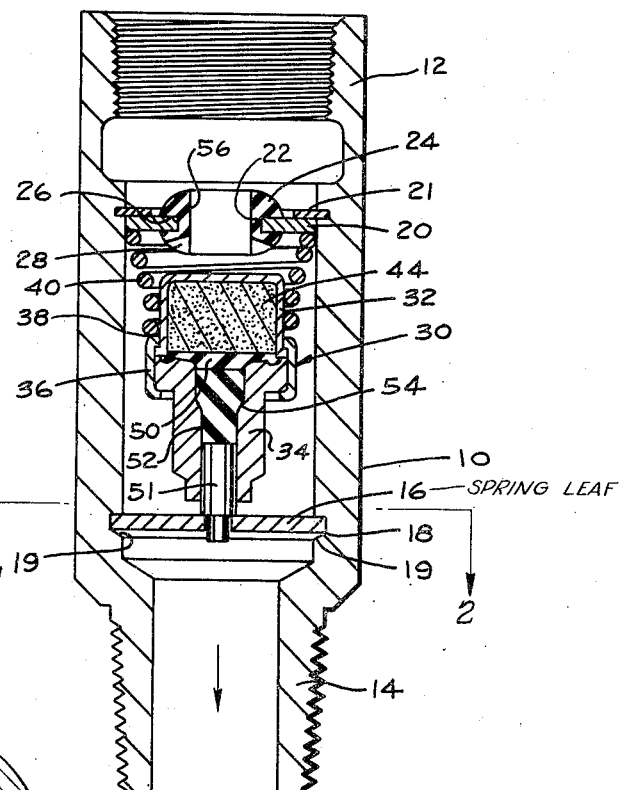
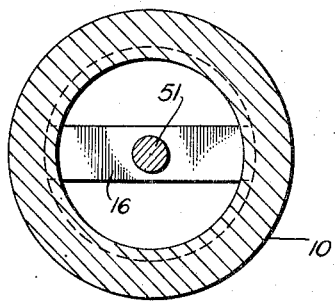
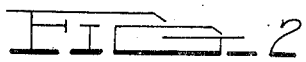
INVENTOR.
JACK K. GOULD
BY
SMITH, WILSON, LEWIS & McRAE United States Patent Office 3,038,664
Patented June 12, 1962

3,038,664
TEMPERATURE LIMITING DEVICE
Jack Kingsley, Gould, Detroit, Mich., assignor to American Radiator & Standard Sanitary Corporation, New York, N.Y., a corporation of Delaware
Filed June 19, 1958, Ser. No. 743,112
3 Claims. (Cl. 236—93)

This invention relates to a fluid temperature limiting device, as for example a device for limiting the temperature of fluid discharged from the shower head of a domestic shower unit.

An object of the present invention is to provide a fluid temperature limiting device wherein the temperature limiting action takes place within a comparatively short time period after occurrence of the excessively high temperature condition, as for example within two seconds, so as to prevent the user from being scalded by a spray of hot fluid.

Another object of the invention is to provide a temperature limiting device which is of small, low cost, compact character so as to be competitive with competing devices.

Another object of the invention is to provide a temperature limiting device which is specially designed to guard against and prevent damage to parts in the event of overtravel caused by the occurrence of excessively high fluid temperatures.

Another object of the invention is to provide a temperature limiting device which returns automatically to an open position when the fluid temperature is decreased to a safe level, thereby enabling the device to be utilized by the householder who is normally not familiar with the internal structure or operation of such devices and who would in most cases consider the use of manually adjustable controls annoying or otherwise objectionable.

Another object is to provide a fluid temperature limiting device which can be easily installed in existing fluid lines, as for example in the conventional shower head, so as to permit installation of the device by a householder without special tools.

Other objects of this invention will appear in the following description and appended claims, reference being had to the accompanying drawings forming a part of this specification wherein like reference characters designate corresponding parts in the several views.

In the drawings

FIG. 1 is a sectional view through one embodiment of the invention, said embodiment being shown in the full open position.

FIG. 2 is a sectional view taken on line 2—2 in FIG. 1.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

In the drawings there is shown a fluid temperature limiting device comprising a valve housing in the form of a flow tube 10 having an internally threaded inlet portion 12 connectable with a fluid line (not shown), and an externally threaded outlet portion 14 connectable with a conventional shower head (not shown). It will be appreciated that fluid flow through flow tube 10 is from inlet 12 through the body portion of the flow tube, and then through outlet 14.

Positioned adjacent the outlet end of the flow tube is a support wall in the form of a spring leaf 16. Spring leaf 16 is formed as a substantially rectangular strip extending across the valve housing tube so as to leave moon-shaped spaces on either side for fluid flow through the outlet 14. It will be seen that spring leaf 16 is seated within a notch 18 in flow tube 10. Notch 18 defines the opposed notch bottom walls, and two notch side walls extending from each bottom wall. One notch side wall defines a surface 19 which is inclined or flared as shown in the drawing so as to facilitate downward deflection or bowing of leaf 16 into a dish configuration for preventing parts damage, as will be explained hereinafter.

A C-shaped retainer 21 removably but fixedly retains annular wall 20 in the inlet end of tube 10. Wall 20 is provided with a central opening 22, in which is received an annular grommet 24 of nylon or other plastic material. As will be seen from the drawing, grommet 24 is of considerably greater axial extent than wall 20 so as to permit formation of an annular groove 26 therein for easy mounting of the grommet onto the support wall. It will also be noted the axial extent of grommet 24 enables one or more notches 28 to be formed in the downstream surface of the grommet for forming a bleed passage. In operation of the valve when thermostatic power element 30 is in a closed position against grommet 24 a small quantity of fluid is allowed to flow through the notches 28; in this manner when the upstream fluid temperature has decreased sufficiently the fluid flowing through notches 28 closely adjacent to the thermostatic power element 30 is effective to cool the thermal material within the power element casing so as to move the parts to the illustrated full-open condition.

Thermostatic power element 30 comprises a brass cup-like container 32 and a sleeve structure 34 held together by means of an annular retaining ring 36. The shoulder 38 formed by ring 36 is adapted to seat one end of compression spring 40, the other end of said spring being seated against wall 20. Container 32 houses a pellet 44 of wax or other thermally expansible material. In order to improve the time response characteristics of the pellet, the pellet may be compounded with copper particles, aluminum particles, or other particles of thermally conductive material, as set forth more particularly in U.S. Patent 2,259,846. In order to seal the wax pellet within the power element casing and provide satisfactory power element travel there is provided a rubber diaphragm 50 and a deformable plug 52 operating in a tapering bore portion 54 of sleeve 34.

In operation of the illustrated device, at low fluid temperatures, as for example 110° F., the valve is in its illustrated position allowing full flow through outlet 14. In the event of excessively high upstream temperatures, as for example 120° F., the fluid impinges directly on power element casing 32 so as to quickly heat expansion material 44 for causing the power element parts 32 and 34 to slide upwardly on piston 51 so as to close against grommet 24 and prevent main flow through the valve. In this manner large quantities of excessively high temperature fluid are prevented from being discharged through outlet 14. In a shower head installation for example, wherein outlet 14 is connected with the conventional shower head, the main flow of high temperature fluid is halted within approximately two seconds after occurrence of the high temperature condition.

It will be noted that when the power element is closed against grommet 24 the small passages 28 remain opened so as to permit a small flow of fluid through the flow tube. This small flow is not objectionable in most cases, as for example in a shower head installation, because it is insufficient to cause a spray action through the shower head; rather there is merely a small dripping action which does not scald the user. The small flow tube passages 28 act to return the power element to its open condition by allowing a small flow to pass closely adjacent the power element casing. Thus, when the upstream temperature cools to a safe level the cool fluid passes through passages 28 very closely adjacent container 32 so as to cool the power element and return it to its illustrated position for allowing full flow through the flow tube.

As previously indicated, member 16 is constructed as a leaf spring for prevention of overtravel damage. In operation, if the fluid temperature becomes so high as to cause the power element to exert an excessive force against grommet 24, leaf spring 16 will be deflected downwardly into a dish configuration so as to compensate for any excessive expansion of the wax pellet 44. In this manner damage caused by overtravel of the power element is prevented.

It will be noted that the device is of comparatively small axial length, one actual device having a total length of less than three inches. Also, the device is a quickly responsive unit. In this connection the power element is positioned with its cup-like container 32 directly in the path of fluid flowing through flow aperture 56. As a result the power element is quickly responsive to fluid temperature change.

I claim:

1. The combination comprising a valve housing; a first apertured wall means within the housing defining an inlet port; a second wall means within the housing spaced downstream from the first wall means to define a support structure; said second wall means being apertured to permit fluid flow thereby; a thermostatic power element positioned between said first and second wall means for expansive movement on fluid temperature increase to substantially close the inlet port; said thermostatic power element comprising a cup-like container having an end wall positioned adjacent the first wall means, a sleeve extending axially from said cup-like container, a piston slidably extending from said sleeve into abutment with the second wall means, annular clamping means securing the cup-like container and sleeve together and forming an annular shoulder facing the first wall means, and thermally expansible material within the cup-like container; a coil spring under compression between said shoulder and the first wall means for holding the power element in spaced relationship with respect to the inlet port at low fluid temperatures; said cup-like container having its end wall in direct axial alignment with the inlet port whereby on fluid temperature increase the fluid flowing through the port strikes the end wall of the cup-like container so as to expand the thermally expansible material and cause the container and sleeve to move toward the port for substantially closing same.

2. The combination of claim 1 wherein the second wall means comprises a spring leaf, and the valve housing is formed with notches in its inner surface receiving opposite ends of said spring leaf; the central portion of said spring leaf constituting a seat for the power element piston whereby the piston can deflect the central portion of the leaf spring in a downstream direction after the inlet port has been substantially closed.

3. The combination of claim 1 and further comprising a by-pass passage extending through the first wall means to pass a pilot flow of fluid around the port when it is substantially closed by the power element.

References Cited in the file of this patent

UNITED STATES PATENTS

| | | |
|---|---|---|
| 39,772 | Hoard | Sept. 1, 1863 |
| 65,047 | Bartol | May 28, 1867 |
| 571,833 | Hunter | Nov. 24, 1896 |
| 1,784,063 | Giesler | Dec. 9, 1930 |
| 2,010,455 | Herzbrun | Aug. 6, 1935 |
| 2,631,781 | Dillman | Mar. 17, 1953 |
| 2,636,776 | Vernet | Apr. 28, 1953 |
| 2,714,759 | Von Wangenheim | Aug. 9, 1955 |
| 2,795,381 | Eskin | June 11, 1957 |
| 2,797,875 | Obermaier | July 2, 1957 |

FOREIGN PATENTS

| | | |
|---|---|---|
| 493,290 | Canada | June 2, 1953 |